(12) United States Patent
Kremerman

(10) Patent No.: US 9,682,331 B2
(45) Date of Patent: Jun. 20, 2017

(54) DISTILLATION KEY AND METHOD OF USE

(71) Applicant: Elliot Kremerman, Scotts Valley, CA (US)

(72) Inventor: Elliot Kremerman, Scotts Valley, CA (US)

( * ) Notice: Subject to any disclaimer, the term of this patent is extended or adjusted under 35 U.S.C. 154(b) by 0 days.

(21) Appl. No.: 15/394,936

(22) Filed: Dec. 30, 2016

(65) Prior Publication Data

US 2017/0113160 A1    Apr. 27, 2017

(51) Int. Cl.
| | | |
|---|---|---|
| *B01D 3/00* | (2006.01) |
| *B01D 3/02* | (2006.01) |
| *B01D 3/14* | (2006.01) |
| *B01L 3/16* | (2006.01) |
| *B01D 5/00* | (2006.01) |
| *B65D 39/00* | (2006.01) |
| *B01D 3/32* | (2006.01) |
| *B01L 3/00* | (2006.01) |
| *B65D 47/12* | (2006.01) |

(52) U.S. Cl.
CPC ........... *B01D 5/0051* (2013.01); *B01D 3/143* (2013.01); *B01D 3/32* (2013.01); *B01L 3/16* (2013.01); *B01L 3/565* (2013.01); *B01L 3/569* (2013.01); *B65D 39/0005* (2013.01); *B65D 39/0047* (2013.01); *B01D 3/00* (2013.01); *B01D 3/02* (2013.01); *B01D 3/14* (2013.01); *B01D 5/009* (2013.01); *B01D 5/0063* (2013.01); *B65D 47/121* (2013.01)

(58) Field of Classification Search
CPC .. B01L 3/16; B01L 3/567; B01L 3/569; B01L 3/565; Y10S 203/02; Y10S 159/16; B65D 39/0047; B65D 39/0005; B65D 39/0011; B65D 39/0094; B65D 39/04; B65D 47/121; B01D 5/0063; B01D 5/009; B01D 3/00; B01D 3/02; B01D 3/14
USPC .... 202/180, 190, 937, 269, 191, 185.1, 187, 202/161; 422/531, 532, 527, 610; 374/141

See application file for complete search history.

(56) References Cited

U.S. PATENT DOCUMENTS

| | | | | |
|---|---|---|---|---|
| 936,467 | A * | 10/1909 | Maurer | B65D 51/28 215/11.2 |
| 2,383,377 | A * | 8/1945 | Evans | G01N 25/145 202/190 |
| 2,535,856 | A * | 12/1950 | Luertzing | B01L 3/565 215/228 |
| 2,582,969 | A * | 1/1952 | Dinsmore | B01L 3/569 165/132 |
| 2,701,789 | A * | 2/1955 | White | B01D 3/4205 202/161 |
| 3,334,025 | A * | 8/1967 | Reid | B01D 3/00 202/161 |

(Continued)

*Primary Examiner* — In Suk Bullock
*Assistant Examiner* — Jonathan Pilcher
(74) *Attorney, Agent, or Firm* — Michael J. Feigin, Esq.; Feigin and Fridman

(57) ABSTRACT

A distillation key which functions as, or with, a stopper and extends into a distillation chamber with multiple rings extending out there-from is used to catch condensing vapors and prevent condensed vapors from re-condensing at a vacuum port at the bottom of the distillation chamber. The key has one or a plurality of rings which extend outwards from an elongated neck thereof, these rings situated and centered relative to vertical walls of the distillation chamber, in embodiments of the disclosed technology.

18 Claims, 12 Drawing Sheets

(56) References Cited

U.S. PATENT DOCUMENTS 3,607,662 A * 9/1971 Glover .................... B01D 3/14
           202/160
4,770,746 A * 9/1988 Mayo ................... B01D 3/4205
           159/DIG. 16

* cited by examiner

Fig. 12A
Fig. 12B
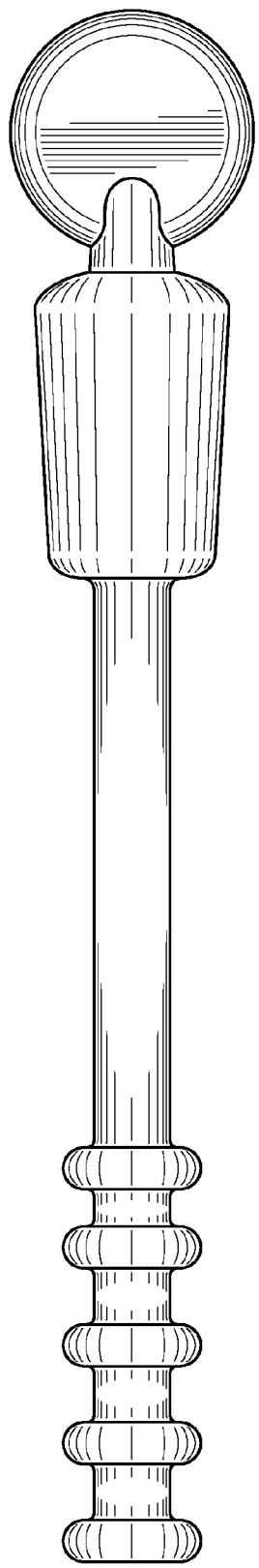
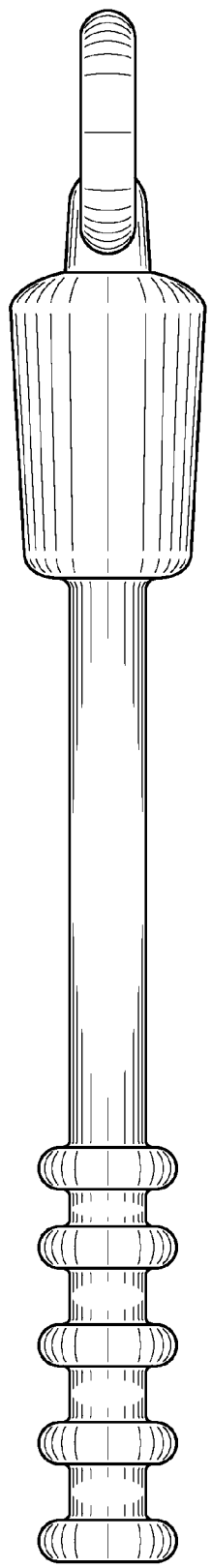

DISTILLATION KEY AND METHOD OF USE

FIELD OF THE DISCLOSED TECHNOLOGY

The disclosed technology relates generally to distillation and, more specifically, to a type of stopper with elongated male region used therewith.

BACKGROUND OF THE DISCLOSED TECHNOLOGY

Distillation or fractional distillation is carried out by heating a solid or liquid and removing gaseous vapors that are expelled therefrom. This can be done while raising the temperature, as each compound boils at a different temperature. However, when working with small amounts of starting raw material or items which have close boiling points, this can be difficult, as multiple compounds get removed simultaneously. Further, a problem can arise when the temperature throughout the distillation equipment is not constant, and some of the vapor re-condenses before being evacuated from a distillation chamber.

Thus, there is a need to find a way to distill with greater efficiency and separation of compounds, while preventing vapors from re-condensing back into the product being distilled.

SUMMARY OF THE DISCLOSED TECHNOLOGY

An embodiment of the disclosed technology uses a distillation device and key. Such a distillation device has a hollow distillation chamber, sometimes with a vacuum jacket, and having multiple entry and exit ports. A "port" is a functional opening into the hollow distillation chamber to another section of the distillation device, the port being narrower than at least one section which it joins to another or to the exterior of the device. A lower load flask port is substantially opposite an upper adapter port. For purposes of this disclosure, "substantially" is defined as "what an ordinary observer would consider to be so" or, only in case of doubt, "within 30 degrees or 10% of being so," such that opposite sides, which are typically 180 degrees apart, can be at least 150 degrees apart to be "substantially opposite".

A discharge portal further opens into the hollow distillation chamber and is used to discharge vapors. Such a discharge portal can be substantially horizontal or normal to the length of the hollow distillation device. Further, for purposes of describing cardinality of direction in this disclosure, a lower or bottom side is said to be where the input port is, which for the distillation device is the load flask port. An upper or top side is said to be where an adapter port is, substantially opposite the load flask port, and where the key of embodiments of the disclosed technology enters into the distillation chamber. In another way of defining upper and lower side, the upper or top side is in the direction where warming vapors usually rise towards, whereas the lower of bottom is where the vapors usually rise from.

As such, the key is used, in embodiments of the disclosed technology, by placing it into the adapter port, and closing the adapter port or fitting it within the adapter port. The key has an upper side with a stopper and lower side with elongated neck, and rings extending normal or perpendicular to the neck. Beneath the stopper, the key is inside the hollow distillation chamber, in embodiments of the disclosed technology, with the rings on the lower side being closest to a corresponding lowest side of the distillation device (despite an actual gravitational orientation of the device, if angled; the lower side is defined by the side closest to the bottom/rings of the key).

The key, when inserted in the hollow distillation chamber, is, in embodiments of the disclosed technology, substantially or fully centered within the inner walls of the hollow distillation chamber when the key closes the adapter port. The neck and/or lower region of the key (having at least one ring extending perpendicular to the neck of the key) has, in some embodiments, a bend corresponding to a bend in the hollow distillation chamber, so that the rings are centered between the walls of the distillation chamber, or at least, substantially so. In embodiments, the rings do not touch the distillation chamber before or during distillation of a product within the distillation device.

The key further has, in some embodiments, a head region above the adapter port, an acutely angled stopper region having a wider top and narrower bottom, with the sides drawing closer to each other from top to bottom. This stopper closes the adapter port in some embodiments of the disclosed technology, and the neck is longer than the stopper. The stopper region, in some embodiments, is a widest region of the key. The 'at least one ring' can be three, four, or more spaced-apart rings.

The key is placed in the adapter port of the distillation device after multiple distillations of a product (including versions of the product, as the product changes with each distillation, "versions" defined as having at least some of the original which have been chemically altered) in the distillation device. When the key is used in the distillation device, vapor condenses on the at least one ring or each of the rings used in embodiments of the disclosed technology. This ring or these rings is/are situated between the discharge portal (or port) and the load flask port.

The key, of embodiments of the disclosed technology, has a head adapted to be external to the distillation device, and a stopper attached to the head having acutely angled sides which are widest closest to the head of the key. A neck extends from the stopper to a plurality of rings extending substantially perpendicular to the neck, a lowest ring being on a side opposite the head. The neck of the key can have a bend conforming to a bend of the hollow distillation chamber of the distillation device, such that the ring or rings is/are centered within the hollow distillation chamber when the stopper stops an adapter port of the distillation device.

The ring, or plurality of rings, can be situated equidistant from inner walls of the hollow distillation chamber and between a load flask port and a discharge port which open into the hollow distillation chamber. Between rings there can be an elongated region having a circumference (using the mathematical definition of a circumference of a circle) equal to that of the neck of the key. A distilled product connects (defined as "attaches") between each of the plurality, of rings in some embodiments.

A curved top side and bottom side of the stopper can be at mirrored angles (reflected, at least at the inner or outer most side of the top/bottom) in comparison to one another, though the top curved side is wider overall in embodiments of the disclosed technology, because the top of the stopper is wider.

In a method of using the distillation device and/or key, one carries out at least one iteration of fractional distillation on a raw material with the adapter port open, then takes the resulting product and carries out at least one additional fractional distillation of a product with the key in the adapter port. The key seals the adapter port, or substantially seals the adapter port, in embodiments of the disclosed technology.

During the at least one additional fractional distillation, vapors being distilled partially condense on the at least one ring, in some embodiments.

Any device or step to a method described in this disclosure can comprise, or consist of, that which it is a part of, or the parts which make up the device or step. The term "and/or" is inclusive of the items which it joins linguistically and each item by itself.

BRIEF DESCRIPTION OF THE DRAWINGS

FIG. 12A shows a front elevation view of the straight key of FIG. 11A.

FIG. 12B shows a side elevation view of the straight key of FIG. 11A.

DETAILED DESCRIPTION OF EMBODIMENTS OF THE DISCLOSED TECHNOLOGY

A distillation key which functions as, or with, a stopper and extends into a distillation chamber with multiple rings extending out there-from is used to catch condensing vapors and prevent condensed vapors from re-condensing at a vacuum port at the bottom of the distillation chamber. The key has one or a plurality of rings which extend outwards from an elongated neck thereof, these rings situated and centered relative to vertical walls of the distillation chamber, in embodiments of the disclosed technology.

Embodiments of the disclosed technology are described below, with reference to the figures provided.

Figure 1:
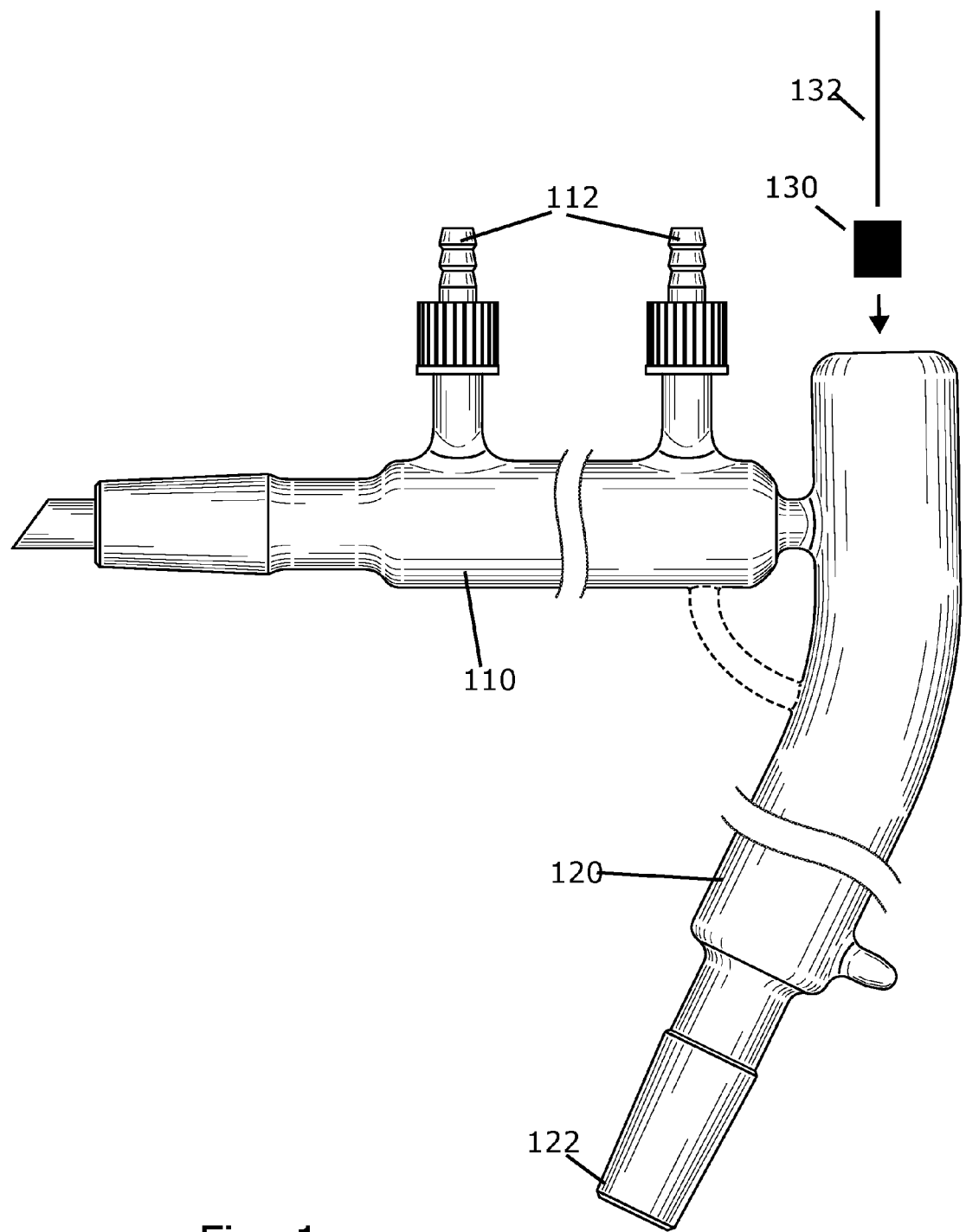
FIG. 1 shows a side view of a bent distillation head used with a key, in embodiments of the disclosed technology.
Figure 2:
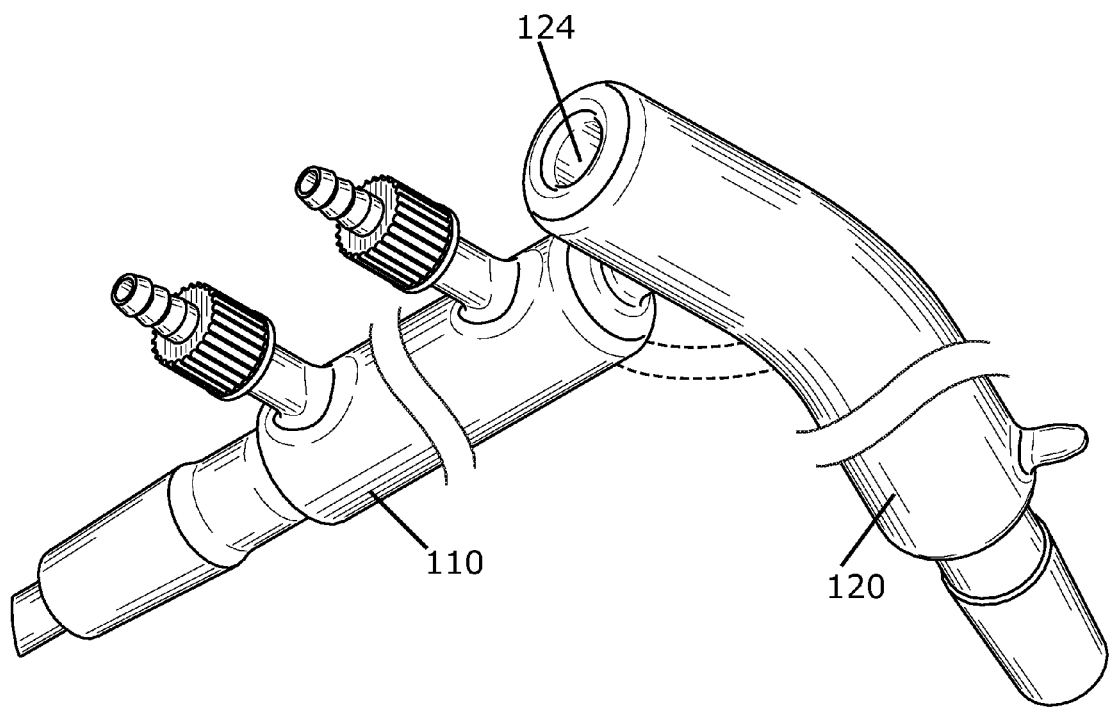
FIG. 2 shows a perspective view of the bent distillation head of FIG. 1.

FIG. 1 shows a side view of a bent distillation head used with a key, in embodiments of the disclosed technology. FIG. 2 shows a perspective view of the bent distillation head of FIG. 1. A distillation head or device has a load flask port 122 at a bottom side thereof opening into a distillation chamber 120. The distillation chamber further has an adapter port 124 at a top side thereof, substantially (or in the case of the straight distillation head discussed below, exactly) on an opposite top side of the device, in embodiments of the disclosed technology. A discharge chamber, or discharge condenser 110, is attached by a portal in a side wall of the distillation chamber 120. The distillation chamber is generally elongated, having its longest length between top and bottom sides thereof, in embodiments of the disclosed technology.

The adapter port 124 can receive a stopper 130 with a flat bottom (such as during a pre-distillation step or fractional distillation step which is carried out before using a key of embodiments of the disclosed technology). Additionally, a thermometer 132 can be used and extend into the distillation chamber.

The discharge condenser 110 is where vapors exit and condense back into liquid form. The hose connections 112 call for water or other fluids to be inserted into a vacuum jacket or jacket around the hollow interior of the discharge condenser 110 to cool the vapors.

Figure 3:
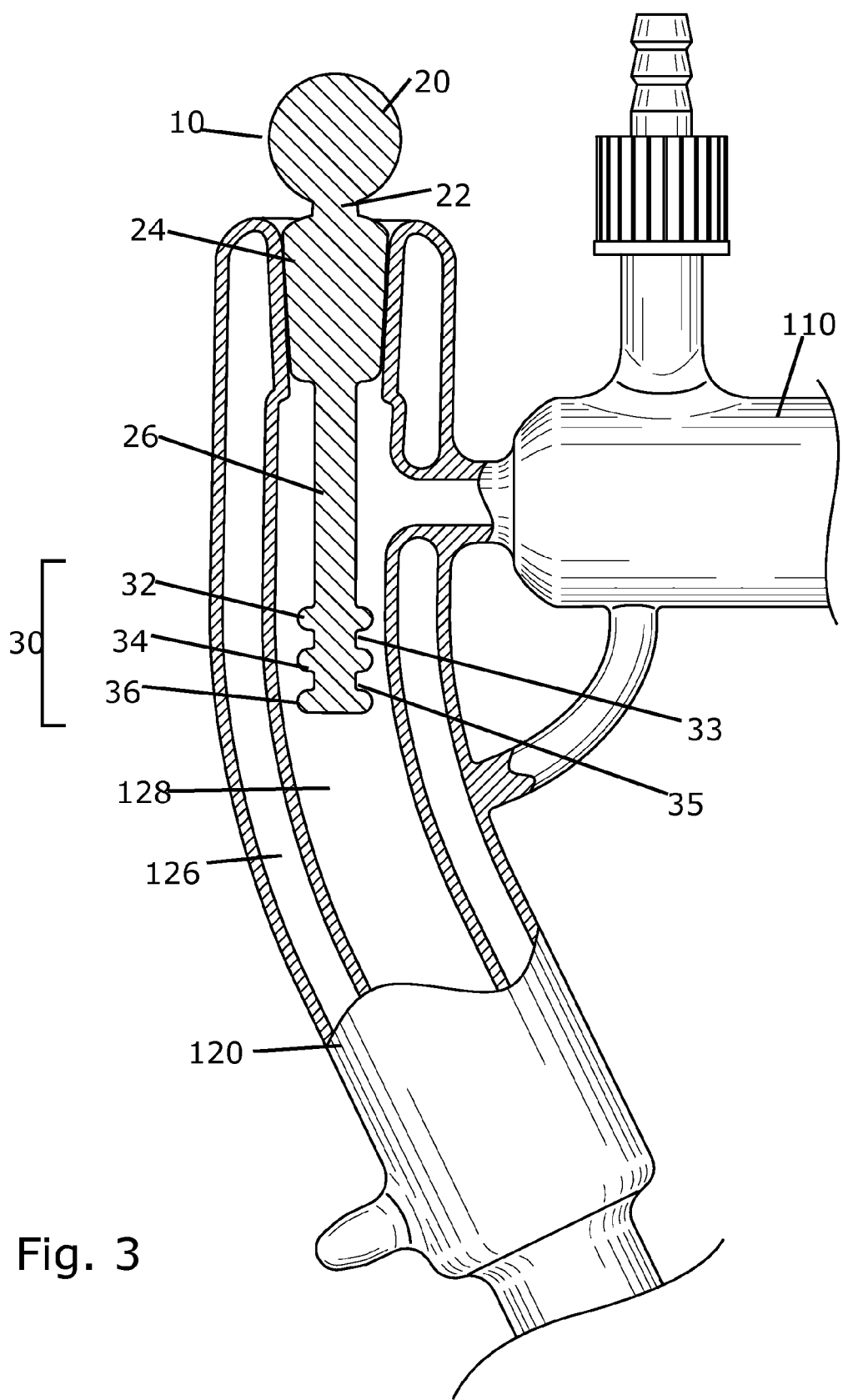
FIG. 3 shows a side cutaway view of the bent distillation head of FIG. 1 with a key inserted therein.

FIG. 3 shows a side cutaway view of the bent distillation head of FIG. 1, with a key inserted therein. Here, in this bent distillation head, the body of the distillation chamber 120 comprises a hollow interior region 128 and a vacuum chamber 126. It should be understood that variations are also within the scope of the disclosed technology, such as including wider or narrower described sections, having more than one or no vacuum chambers 126, or using other forms of insulation. A bent key 10 is placed into the hollow distillation chamber, filling the adapter port 124 and substantially or fully sealing this port. The bent key itself will be discussed with reference to the following figures.

Figure 4A:
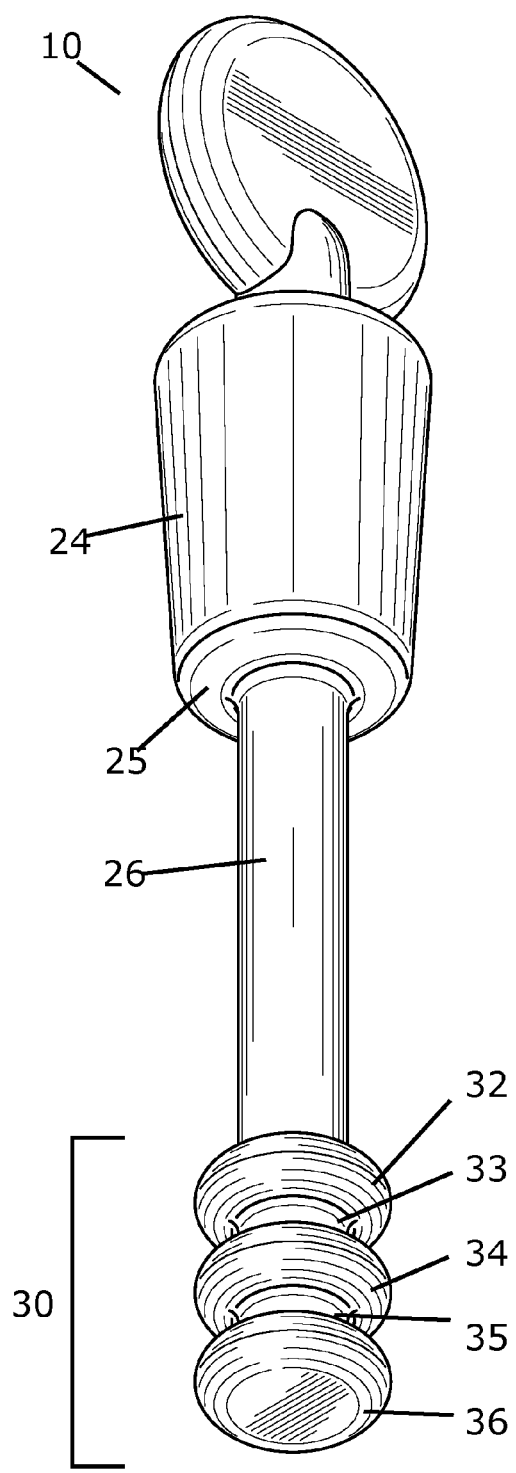
FIG. 4A shows a bottom and side perspective view of a bent key used in embodiments of the disclosed technology.
Figure 4B:
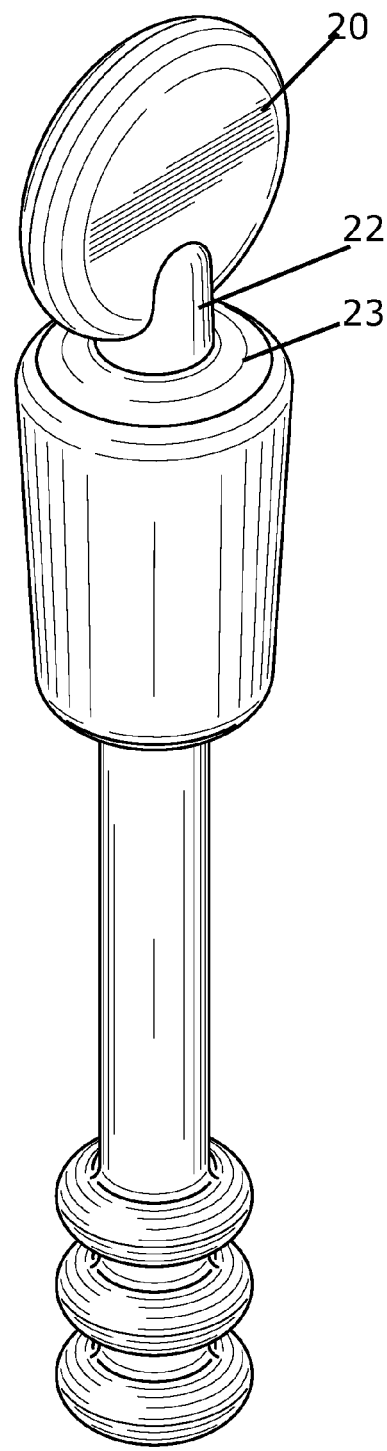
FIG. 4B shows a top and side perspective view of the bent key of FIG. 4A.

FIG. 4A shows a bottom and side perspective view of a bent key used in embodiments of the disclosed technology. FIG. 4B shows a top and side perspective view of the bent key of FIG. 4A. The neck 26 of the key 20 is slightly bent (between 1 and 5 degrees in some embodiments) to accommodate the bend in the distillation head. This ensures that when the key 10 is inserted into the adapter port 124, the neck and/or the rings 30 of the key 10 are centered within, or substantially centered within, the distillation chamber 120.

The key 10 has, in the embodiment shown, a top section or grasping region 20, which is adapted to be outside of the distillation device's adapter port 124 when the key 10 is inserted therein. A stopper 24 having a top side 23 connects to the grasping region 20 via a connector 22. The connector 22, a neck 26, and spaced-apart regions 33 and 35 can have a same circumference and diameter. The key is formed from glass, in embodiments of the disclosed technology, and can be formed from a single piece thereof. Other materials can also be used, especially those which are non-reactive.

The stopper 24 of the key 10 has, in some embodiments, tapered sides which are narrower at a bottom side (closer to the bottom ring 36 than the grasping region 20) than at a top side (closer to the grasping region 20 than the bottom ring 36). The stopper 24 thus has acutely angled sides in embodiments of the disclosed technology, defined by the wider top side 23 and narrower bottom side 25. "Wider" and "narrower" in this disclosure refer to a direction normal to, or substantially normal to, the top and bottom direction of the devices with the top of the key being a side with the grasping region 20, and the bottom being a side with rings, including a lowest ring, such as ring 36. The top side 23 of the stopper and bottom side 25 of the stopper can be a reflected or mirrored version of one another, and be curved or angled compared to a strictly longitudinal direction (normal to an axis extending from top to bottom).

The neck 26 of the key extends between the stopper 24 and a first or top-most ring of the key, in this case the top ring 32. The neck allows the stopper 24 to stop up the adapter port 124, while the rings 30 are centered, or substantially centered, within the distillation chamber 120. The neck can be of any width which holds the rings 30 in place during usage of the distillation device, such as during distillation.

The rings 30 can include a single ring or a plurality of rings, such as rings 32, 34, and 36. It should be noted that the attorney of record has found an alternate usage of the key 10 to satisfy one's need for oral fixation. Instead of a pen, which can leak, the key has two ends where one can chew on the device without risk of ink leaking. When one gets tired of biting on the grasping region 20, one can suck on the rings 30 in general, or bite down between the rings at 33 or 35. The rings 30 have regions there-between which can be slightly elongated, such as elongated or connecting regions 33 and 35 which extend between adjacent rings. The rings can serve to cause vapors, or a part thereof, especially with heavier, denser, and/or larger particles to condense and return back out the load flask port 122.

Figure 5A:
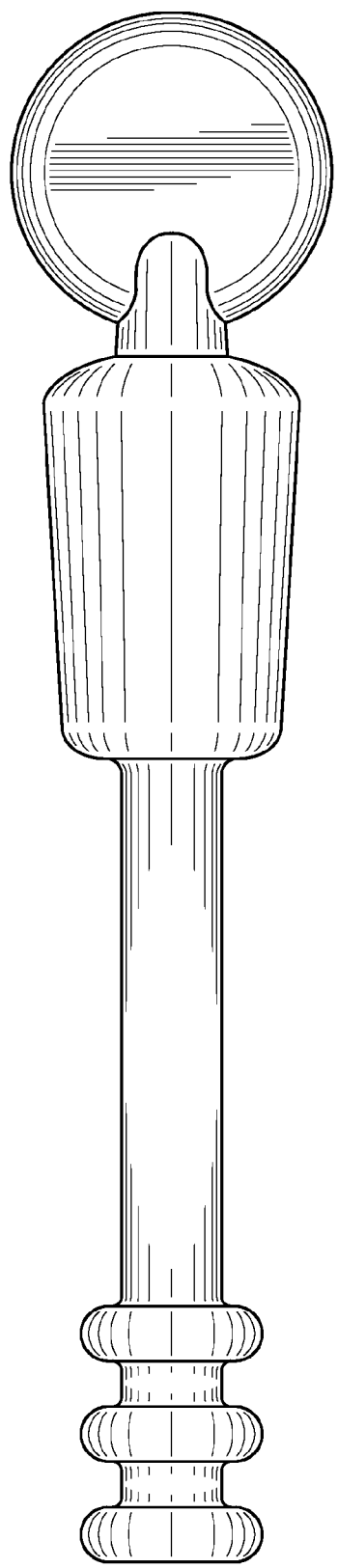
FIG. 5A shows a front elevation view of the bent key of FIG. 4A.
Figure 5B:
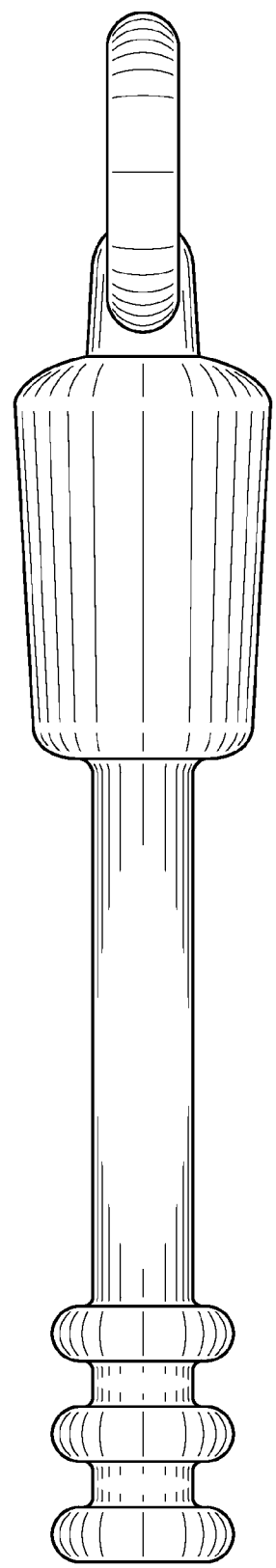
FIG. 5B shows a side elevation view of the bent key of FIG. 4A.

FIG. 5A shows a front elevation view of the bent key of FIG. 4A. FIG. 5B shows a side elevation view of the bent key of FIG. 4A. These additional figures show the symmetry of the key, in embodiments of the disclosed technology. The scale is accurate to one embodiment of the key 10; however, the slight bend, while existing, is not noticeable in the rendering shown.

Figure 6:
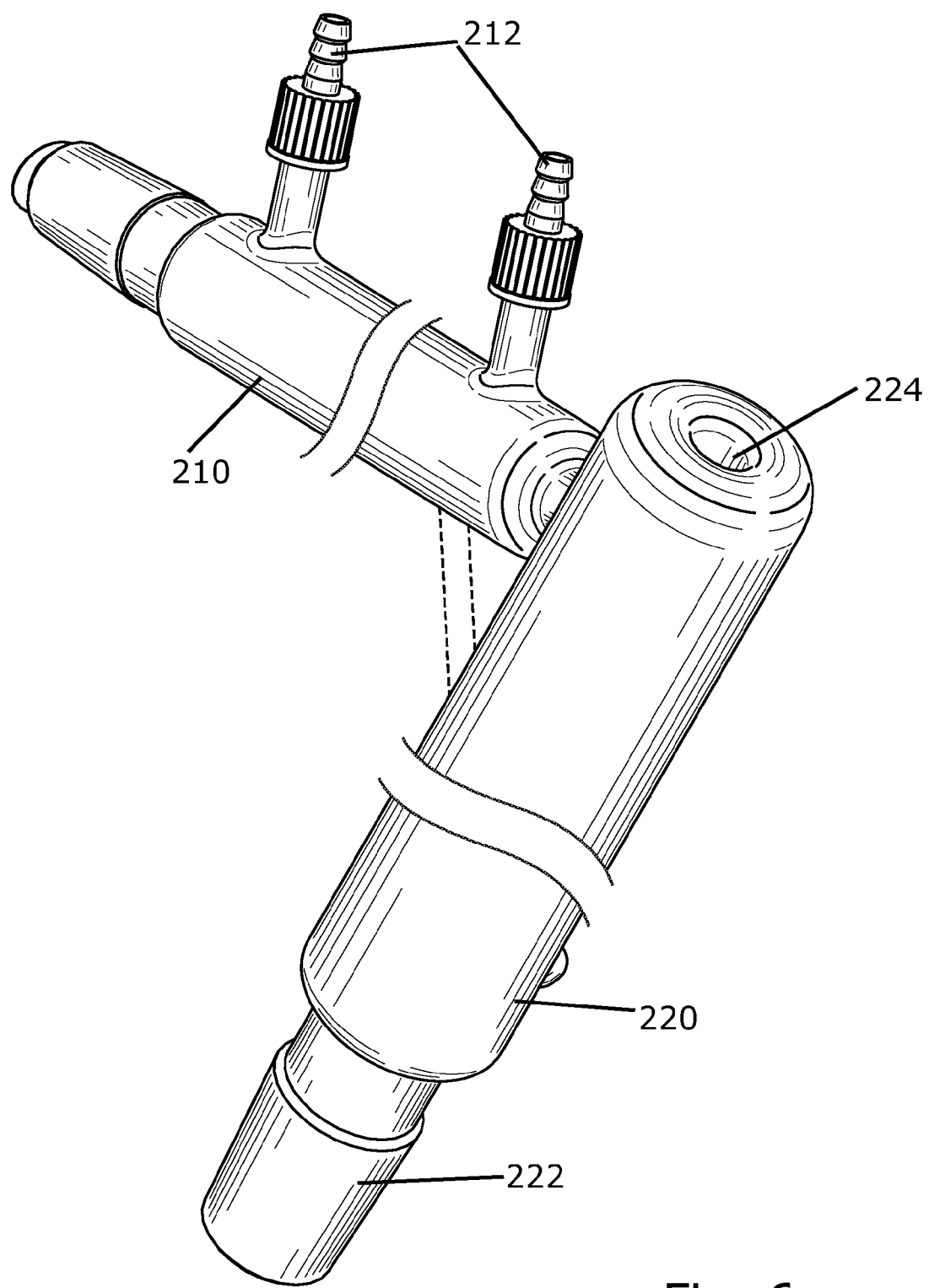
FIG. 6 shows a perspective view of a straight distillation head used with a key, in embodiments of the disclosed technology.
Figure 7:
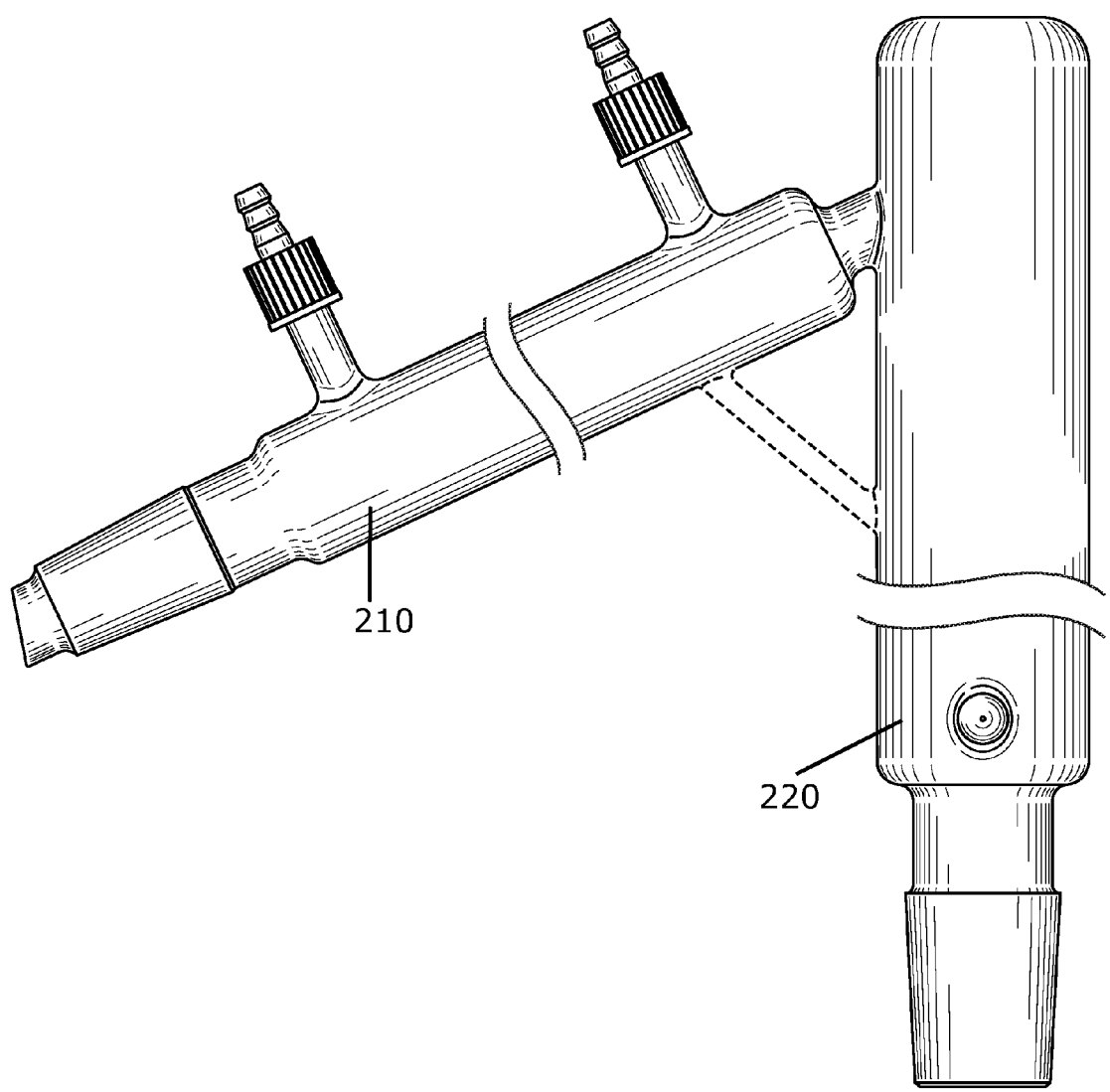
FIG. 7 shows a side elevation view of the straight distillation head of FIG. 6.

FIG. 6 shows a perspective view of a straight distillation head used with a key, in embodiments of the disclosed technology. FIG. 7 shows a side elevation view of the straight distillation head of FIG. 6. Elements described with reference to the bent distillation head have been incremented by 100. The distillation chamber 220 is straight (without a bend) from bottom to top, and, as such, the adapter port 224 is directly above the load flask port 222, in the embodiment shown.

Figure 8:
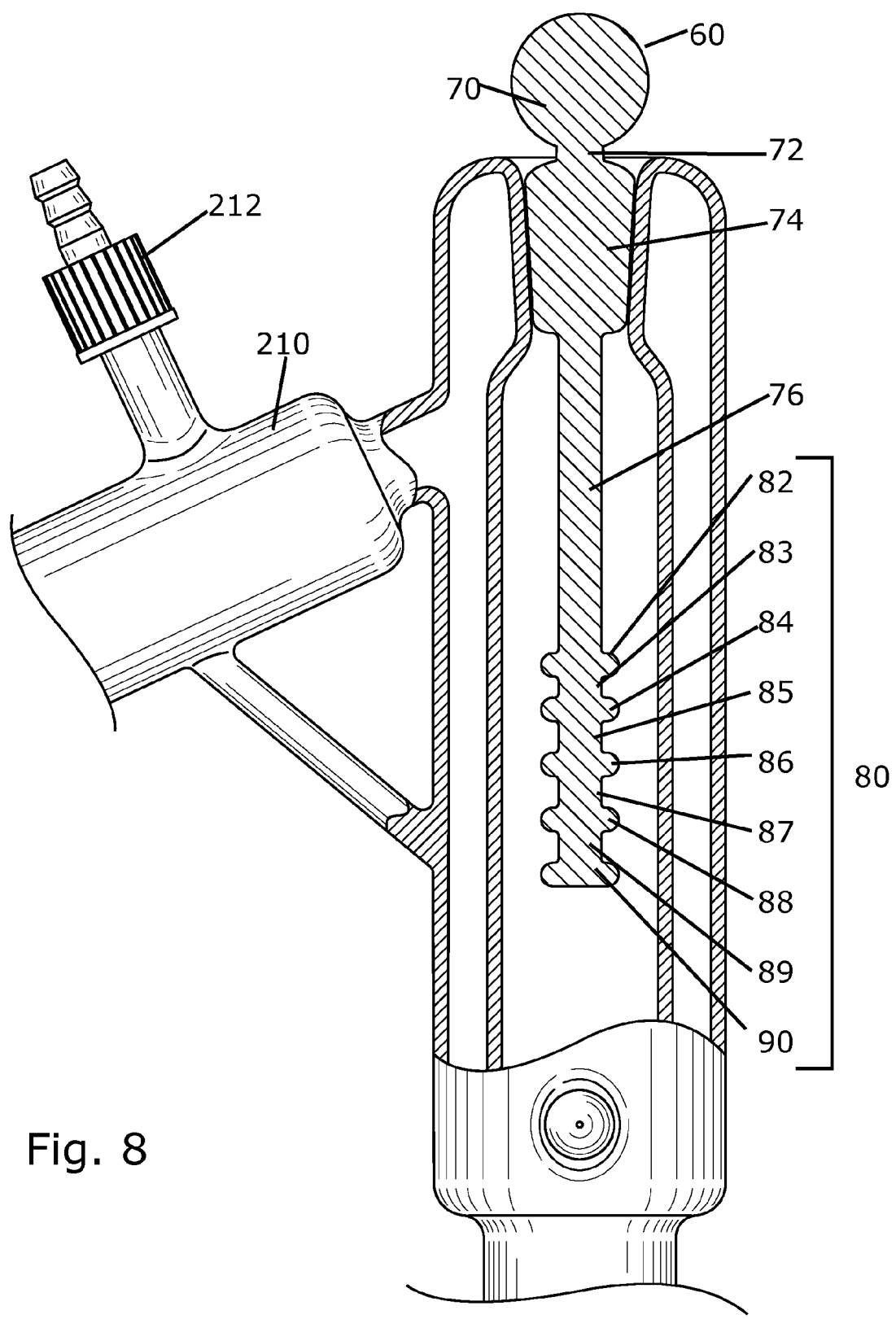
FIG. 8 shows a side cutaway view of the straight distillation head of FIG. 6 with a key inserted therein.

FIG. 8 shows a side cutaway view of the straight distillation head of FIG. 6, with a key inserted therein. Elements described with reference to the key 10 have been incremented by 50, with reference to the key 60 shown in FIG. 8 and later figures. The key 60 has a head 70, stopper region 74, neck 76, and rings 80. Here, five rings are shown, namely rings 82, 84, 86, 88, and 90. Spaced-apart regions between the rings are regions 83, 85, 87, and 89.

Figure 9:
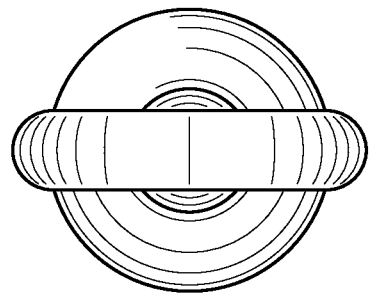
FIG. 9 shows a top plan view of keys used in embodiments of the disclosed technology.
Figure 10:
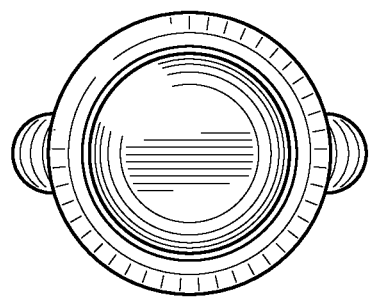
FIG. 10 shows a bottom plan view of keys used in embodiments of the disclosed technology.

FIG. 9 shows a top plan view of keys used in embodiments of the disclosed technology. FIG. 10 shows a bottom plan view of keys used in embodiments of the disclosed technology. One can see the grasping region being widest and the top of the stopper as well as bottom ring in these figures.

Figure 11A:
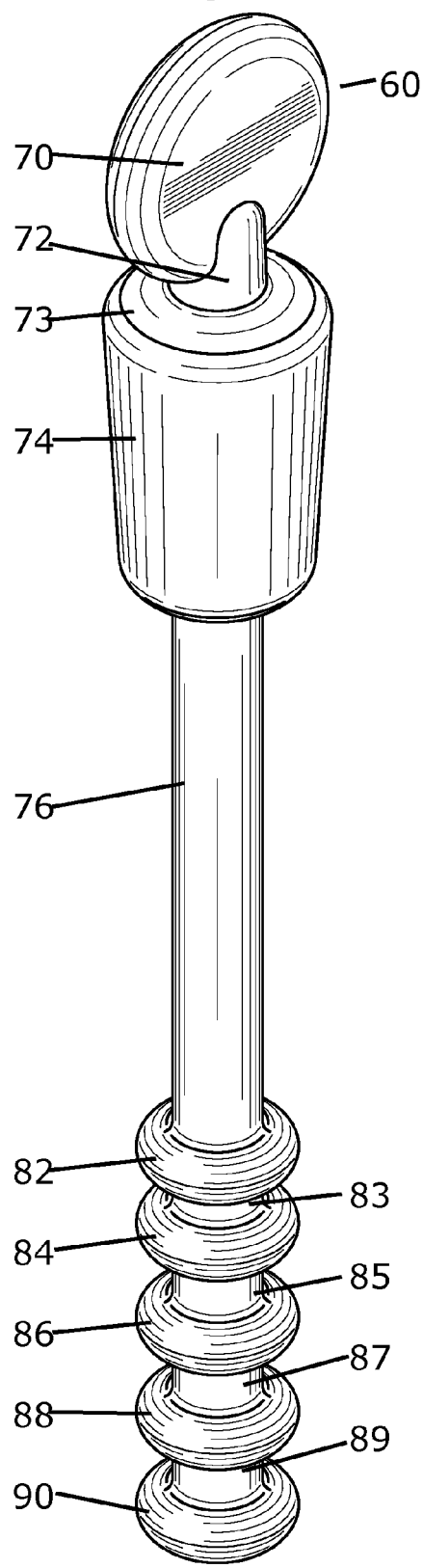
FIG. 11A shows a top and side perspective view of a straight key used in embodiments of the disclosed technology.
Figure 11B:
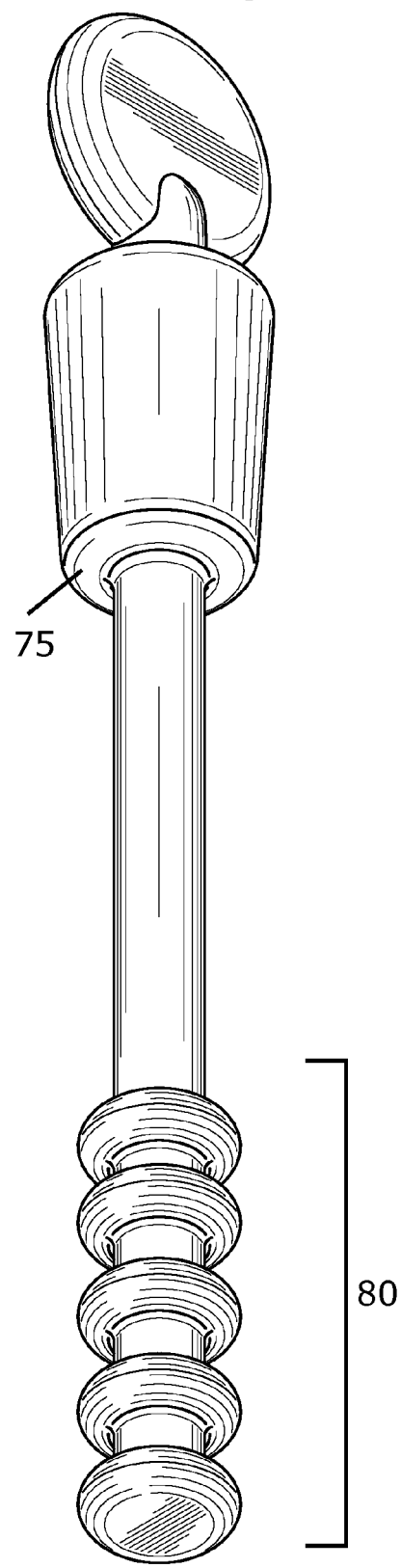
FIG. 11B shows a bottom and side perspective view of the bent key of FIG. 11A.
Figure 13:
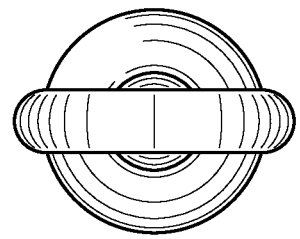
FIG. 13 shows a top plan view of the straight key of FIG. 11A.
Figure 14:
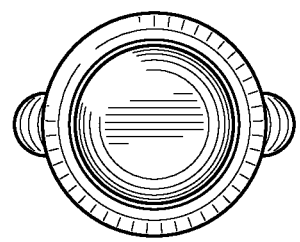
FIG. 14 shows a bottom plan view of the straight key of FIG. 11A.

FIG. 11A shows a top and side perspective view of a straight key used in embodiments of the disclosed technology. FIG. 11B shows a bottom and side perspective view of the bent key of FIG. 11A. FIG. 12A shows a front elevation view of the straight key of FIG. 11A. FIG. 12B shows a side elevation view of the straight key of FIG. 11A. Again, elements of the key 10 have been incremented by 50 when showing the straight key 60.

Now describing methods of using the devices of the disclosed technology, a bare plug 130 (defined as having a flat, or substantially flat, portion which opens to the inside of the distillation unit) is used to close and seal the portal 124 or 224 in some embodiments, where the key 10 or 60 is not used. Alternatively, a thermometer 132 with stopper 130 can be used to close this portal, causing a low thermal mass directly underneath the stopper ("directly underneath" defined as less than 10% or 20% of the distance from the bottom of the portal 124 or 224 to the most dstant/opposite side of the distillation head). A vacuum, or partial vacuum is created within the interior of the distillation head during these steps.

The method of using a device of embodiments of the disclosed technology is carried out by way of heating a plant-based product to be distilled at a load reaction temperature. This is carried out, in embodiments of the disclosed technology, at a minimum load reaction temperature of 100, 200, or 300 degrees Celsius. Then begins a pre-distillation step. In the pre-distillation step at the load reaction temperature, vapor rises from a product being distilled in a highly saturated and contaminated form. It is saturated and contaminated with mixed boiling point compounds and components which make up the product. This vapor, once re-condensed into solid form after cooling, is now what is referred to herein as a "raw body". The raw body is defined as a mass of material comprising impure compounds from an initial violent release of molecules, during distillation with unwanted fats. The fat removal is accomplished by sequential temperature filtration methods (utilizing ethanols) from higher temperature, using higher micron filtration and lowering temperature in steps with lower micron filtration. This process is repeated until desired clarity and initial purity are reached. The removal of fats, lipids, waxes, and necessary undesirable forms of dissolved solids through cold-subzero filtration is required. A second step of removing unwanted compounds is now applied, with selected carbon for results. This step also removes unwanted compounds that are attracted chemically to the carbon. The third preparation step is done after an initial solvent(ethanols) is removed.

The process to this third step is as follows:
1. dissolve organic resin
2. sequential cold filtration
3. carbon scrubbing
4. removal of solvent
5. reintroduction of hexane/cyclohexane at 1:4(hex)

Step 3 is carried out, in some embodiments, using a soluted hexane/cyclohexane mix followed by a salt water/saline wash. This process removes water soluble compounds from the oil layer. These typical water soluble compounds like aldehydes, esters, keytones, proteins, when burnt, produce an unwanted odor result when left behind during a distillation at high temperatures. These compounds are removed in order to reduce final boiling point at the end of all distillations. It is often advantageous to remove water soluble compounds from the oil layer in the raw organic resin to ensure a most purified end product.

In the above steps, the distillation equipment is used without the key, in embodiments of the disclosed technology. That is, the "key" is not used in the first "pre-distillation" step, in embodiments of the disclosed technology.

The primary distillations are now carried out, in embodiments of the disclosed technology, on the resultant product of the pre-distillation. This can include multiple occurrences of loading the resultant product of the prior distillation or pre-distillation in the device shown, or another distilling device. In some embodiments, on a second pass of distillation, the key is placed in and seals the upper portal 124. A desired fraction is then distilled from the body and is herein referred to as the "main body." The main body is one which is distilled with the key in the distillation equipment, as described above. In further iterations of the primary distillations which use the main body or derivatives there-from, a lower temperature is used than in the "pre-distillation" steps in embodiments of the disclosed technology. This is further carried out by way of using the same or a different distillation device from the pre-distillation. When distilling the main body, evacuation of the resulting product is carried out faster than compared to distillations which first produced the main body or those occurring before such a step. This is due to the higher temperature use being required to release the desired molecules from the first "pre-distillation" distillation process, such as temperatures of 140-300 Celsius. Comparatively, the main body has fewer impurities and can therefore be evacuated faster, despite being carried out at lower temperatures. Being "evacuated" is defined as exiting from the distillation device.

Some notable aspects resulting from the first pass (distillation of the main body, first time) is that the boiling point is in a smaller range for the product being distilled (main body) than in subsequent distillations. This is due to chemical compounds and/or solids that are not yet fractioned off. During pre-distillation, the desired molecules will release under vacuum pressures and heat as applied by ancillary hardware. During the release of energy (vacuum+heat) boiling points are reached, and desired or selected compounds will evaporate, and during this time there is a subsequent similar release of boiling points during this process. These similar boiling points are subject to release through evaporation due to the high amount of energy (vacuum+heat) being applied. The targeted compounds being evaporated are subject to low to medium amounts of similar boiling points collectively evaporating alongside the targeted boiling points. As other chemical compounds are present, the boiling point of desired compounds are higher in this initial pass. With each successive pass, as portions are fractioned off, the boiling point of the remainder which is distilled in this manner rises in pure concentration, due to the lack of similar boiling point substances being present in each pass, or in this case the first pass.

Discussing now the use of a stopper or the key in more detail, during the first distillation a key is typically not used, in order to allow full vapors to pass through the distillation head and out of the upper port. Anything in this area can vastly decrease efficiency during pre- or first distillation, as it will extend rejection rates. This also causes issues from being under a high energy load (vacuum+temperature) for extended periods of time.

A key used in embodiments of the disclosed technology is defined as a device with a first portion sized to stop, or substantially stop up, a portal of distillation equipment, and a second end which extends downwards into an interior of the distillation head and untouched by the distillation equipment on this second end. The second end further has at least one or a plurality of circular rings spaced apart from each other, and extending perpendicular to a most elongated, or substantially elongated, neck of the key. The neck is defined as a region extending between the first portion of the key (which stops the portal) and a longitudinal ring which is closest o the first portion.

A bare plug (defined as having a flat, or substantially flat, portion which opens to the inside of the distillation unit) is used to close and seal the portal, in some embodiments where the key is not used. Alternatively, a thermometer with stopper can be used to close this portal causing a low thermal mass directly underneath the stopper ("directly underneath" defined as less than 10% or 20% of the distance from the bottom of the portal ## to the most distant/opposite side of the distillation head). A vacuum or partial vacuum is created within the interior of the distillation head during these steps.

Once the pre-distillation, and at least one pass of distillation of the main fraction is completed, then at least one additional distillation pass is completed with the key 10 in the portal. The key insertion end (a second end with longitudinal/circular rings) extends down into the inner hollow region of the distillation head. During distillation with the key, upwards of a 60% rejection rate under normal speeds is achieved. The rejection rate is defined as the stream of molecules rising up to the condenser port which are reabsorbed by the internal mass or product being distilled. The heavier impure compounds in the desired boiling point that are present in evaporation during the same time are being released at a slower rate since "pre-distillation" has occurred. In the current distillation, these harder to remove molecules gravitate to the key rather than being reabsorbed by the product being distilled. The vapors become absorbed and create a liquid phase mass at the product, rather than being removed therefrom.

What further makes this rejection rate unique to the present technology, compared to the prior art, is that in the prior art, impure compounds will drag along the interior walls of the distillation equipment. Here, vapor passing the key is highly more excited than vapor which condenses on the key. The heavier compounds that are evaporating also have a lower energy mass that has subsided during the action of rising upwards. This leaves an advantageous effect of rejection while the path does not drag condensate up the walls of the distillation head. Instead, it absorbs to the core of the path and allows a continuous rejection back into the mass of organic compounds during the distillation process. The product being distilled in this or other iterations can be under- or over-saturated to achieve a higher or lower operational rejection rate.

In the prior art, when using heavier compounds which are far less efficient at re-condensing in separate forms via what is known in the art as the theoretical plate effect, the protrusions extending out from the insertion end of the key offers a advantageous effort to drag impure condensate upwards towards the discharge section.

In an example, a product of 1000 grams of processed and polished raw material extracts at 250 Celsius was passed through the pre-distillaton process leaving an extract of 800 grams. This took 45 minutes. Then the key was inserted and distillation was repeated with the 800 gram prior-created product. A lower temperature of 200 degrees, and then 210 degrees Celsius was set, with deeper vacuum available due to purer load rate from initial usable product loaded from the initial fast higher temperature extraction.

It was found that, if the first extraction (pre-distillation) was done, with key or with basic penny head stopper, the initial temperatures must be much higher, even if limited vacuum is present to regulate a slower reaction to attempt to collect a first pass purity that is higher. It was also found that the higher longer required 3-4+ hour residency time would degrade the starting material, and yield losses were established basically on temperature and over energized reactions in load flasks. This would break down chemical compounds to an isomer of itself. This results in a degraded product and yields an overall lower visually purer product as well as lower percentage purity to volume when tested. It was found that the higher speed initial extraction to yield its most available compounds during the first extraction was the most sufficient material to initiate the use of the key in the distillation head.

It was established during research and design and testing that vapor that has separated from the reaction at the neck traveling upwards also has impure and heavier boiling points that are evacuated under vacuum during a free radical effect during the evaporation of any distillation in vapor form. The heavier and unwanted compounds actually were found under invention to absorb a mass, if it was present. The mass chosen was between 2 to 3¼ inches. This distance is arbitrary, as desired compounds will fall further to the attraction of a mass in a advantageous pattern depending on where the mass is located. Under intellectual property knowledge the released compounds list varies based on the initial purity. Different masses must be allocated in otherwise non-traditional patterns and shapes to absorb the unwanted impure compounds direct to the inserted mass.

The use of the key has a three part effect to validate its use and effectiveness that was otherwise unavailable in short path distillation, until the research and design applied to the use of fractional distillation in relation to ultra-pure compounds extractions.

It was found that the key absorbs the unwanted unsure compound as a mass, and drips it back down to the bottom. It was found that a much purer compound both tested and visually was expelled from the discharge side. The notable difference is the visual reaction under both human eye, and UV light. With the key, a color much brighter and purer noticeably drips off compared to the same reaction conditions (such as those described above) without the key. It was noted under the intentional design and factored in rate that, while key 10 or 60 was being used, the color and visual difference of the output of extracted product was substantially brighter, in many cases almost clear—with no color. The notable effect was without the key, one color, with the key, discharge from its own mass was substantially lighter, and the discharge finished product color was substantially lighter in color and clarity than the section with the key. In a three part effect the advantageous usage of the key would absorb between 30-60% of the traveling boiling points, during standard distillation in vapor form, and re-condense them to a rejected drip that would fall on top of the distillation equipment section and further fall back and reject into the reaction load flask.

There is a proven and established use related to lower temperatures in the boiling flask/load flask. The first pass extraction with a key inserted in the upper port can be done with achievable and notable results determined by way of visual inspection (clearer or more homogeneous colored product) and purity (higher concentrations of more homogeneous products) by volume. This can be done as a pre chemical extraction prior to loading up raw starting material that otherwise would have to be polished with known mediums like micron papers and carbons. When some lower temperature compounds that come out more easily are present, we are able to manage the vapor flow and rejection rates more easily. When the temperatures are higher, it is advantageous to perform the step with the key inserted after the first extraction of boiling points. However, it was noted during the testing and design that extended periods of time were needed during the first pass with the key. So it was determined that the use at a first pass was only subjected to the same results if the initial load solution was pure from a pre-extraction process using chemicals known to extract desired compounds, and or acidification of base application of pH alterations during pre-processing protocols.

While the disclosed technology has been taught with specific reference to the above embodiments, a person having ordinary skill in the art will recognize that changes can be made in form and detail without departing from the spirit and the scope of the disclosed technology. The described embodiments are to be considered in all respects only as illustrative and not restrictive. All changes that come within the meaning and range of equivalence of the claims are to be embraced within their scope. Combinations of any of the methods, systems, and devices described herein-above are also contemplated and within the scope of the disclosed technology.

I claim:

1. A combination distillation device and key, comprising:
   a hollow distillation chamber having a lower load flask port, an upper adapter port, and a discharge portal, wherein said load flask port and said adapter port are on substantially opposite sides of said hollow distillation chamber, and said discharge portal opens into a discharge condenser;
   a single unitary structured key without portals into an interior thereof, closing said adapter port or adapted to fit within said adapter port;
   said key further comprising, a neck region and lower region which extend into said hollow distillation chamber without contacting inner walls of said hollow distillation chamber when said key closes said adapter port;
   said lower region of said key further comprising at least one ring extending perpendicular to said neck of said key.

2. The combination distillation device and key of claim 1, wherein said neck has a bend conforming to a bend in said hollow distillation chamber, such that said lower region is centered in said distillation chamber when said key closes said adapter port.

3. The key of claim 2 wherein said bend is at an angle between 1 and 5 degrees.

4. The combination distillation device and key of claim 1, wherein said key comprises a head region above said adapter port when said key closes said adapter port, an acutely angled stopper region which carries out said closing of said adapter port, and said neck is longer than said head region and connects said stopper region to said lower region.

5. The combination distillation device and key of claim 4, wherein said stopper region of said key is a widest region thereof, at least a majority thereof is interior to said distillation device, and said at least one ring is at least three spaced-apart rings.

6. The combination distillation device and key of claim 1, wherein said key is placed in said adapter port of said distillation device after multiple distillations of a product in said distillation device, and vapor condenses on said at least one ring.

7. The combination distillation device and key of claim 6, wherein said at least one ring is situated between said discharge portal and said load flask port when said key is in said adapter port.

8. A method of using said combination distillation device and key of claim 1, comprising:
   carrying out at least one iteration of a fractional distillation on a raw material with said adapter port of said hollow distillation chamber open such that vapors exit through said adapter port at a top of said distillation chamber and said evacuation port on a side of said distillation chamber;
   then carrying out at least one additional fractional distillation of a product of said prior at least one iteration with said key in said adapter port such that vapors rise in an upwards direction, past said at least one ring and out an evacuation chamber situated between a heat source and said adapter port.

9. The method of claim 8, wherein during said at least one additional fractional distillation vapors being distilled partially condense on said at least one ring during said at least one additional fractional distillation and fall back through said lower load flask port.

10. The method of claim 9, wherein said at least one ring is at least three rings having a space between each said at least three rings and vapors additionally partially condense on each said space.

11. A key, comprising:
a head adapted to be external to a distillation device;
a stopper attached to said head having acutely angled sides which are widest closest to said head;
a neck extending from said stopper to a plurality of rings extending substantially perpendicular to said neck, a lowest ring being on a side opposite said head;
wherein said key is without portals and formed from a single piece of non-reactive material.

12. The key of claim 11, wherein said neck of said key has a bend conforming to a bend of a hollow distillation chamber of said distillation device such that said plurality of rings is centered within said hollow distillation chamber when said stopper stops an adapter port of said distillation device.

13. The key of claim 12, wherein said plurality of rings is situated equidistant from inner walls of said hollow distillation chamber, and between a load flask port and a discharge port, which open into said hollow distillation chamber;
wherein said discharge port opens into a side wall of said hollow distillation chamber; and
wherein said hollow distillation chamber is most elongated in one direction, and said discharge port is at an end of said most elongated direction.

14. The key of claim 11, further comprising a curved top side and bottom side, said curved top side being wider than said curved bottom side, and a majority of said stopper is within said hollow distillation chamber.

15. The key of claim 14, wherein between adjacent rings of said plurality of rings there is an elongated region having a circumference equal to that of said neck.

16. The key of claim 15, wherein a distilled product condenses between adjacent said plurality of rings.

17. The key of claim 11 wherein said bend is at an angle between 1 and 5 degrees.

18. A combination distillation device and key, comprising:
a hollow distillation chamber having a lower load flask port, an upper adapter port, and a discharge portal, wherein said load flask port and said adapter port are on substantially opposite sides, and said discharge portal opens into a discharge condenser;
a single unitary structured key formed from a single piece of material, closing said adapter port or adapted to fit within said adapter port;
said key further comprising a neck region and lower region which extend into said hollow distillation chamber without contacting inner walls of said hollow distillation chamber when said key closes said adapter port;
said lower region of said key further comprising at least one ring extending perpendicular to said neck of said key.

* * * * *